May 15, 1962   J. HIMKA ETAL   3,034,823
VEHICLE BODY

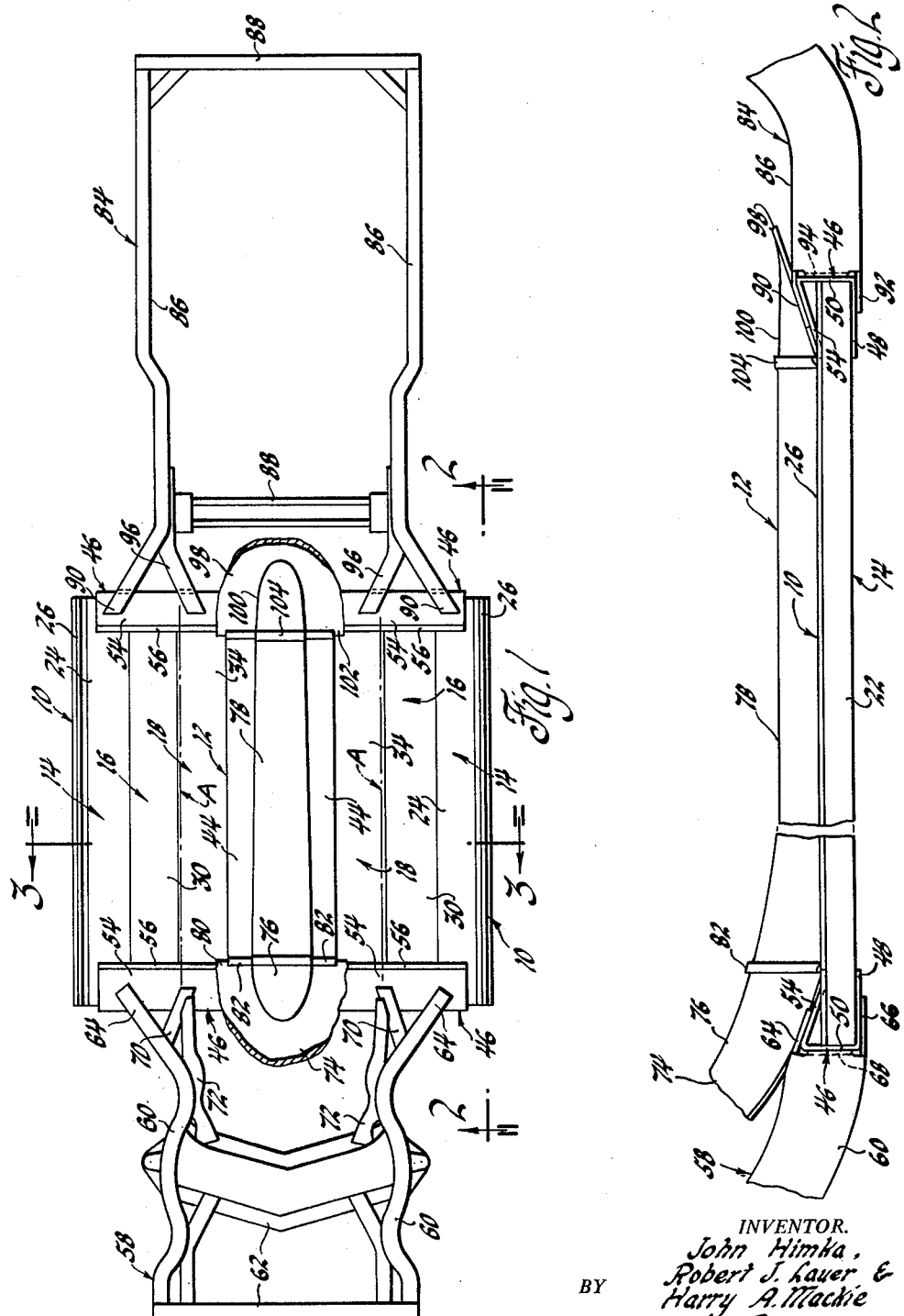

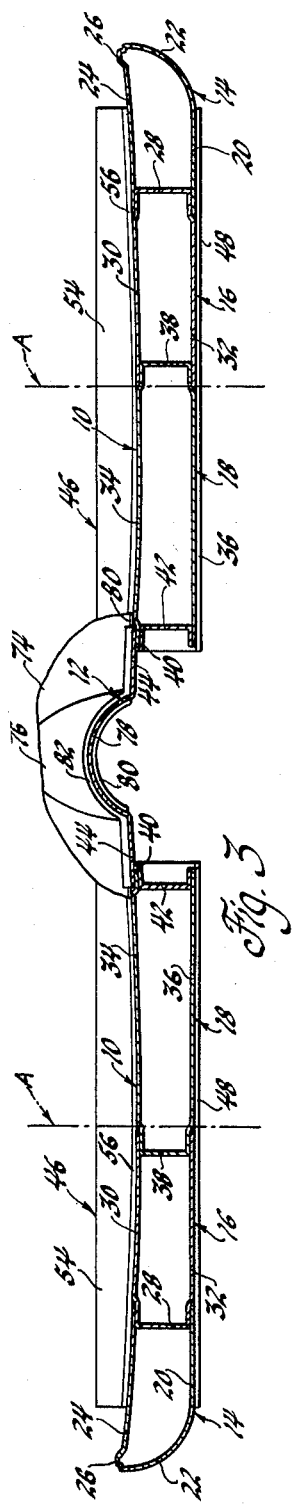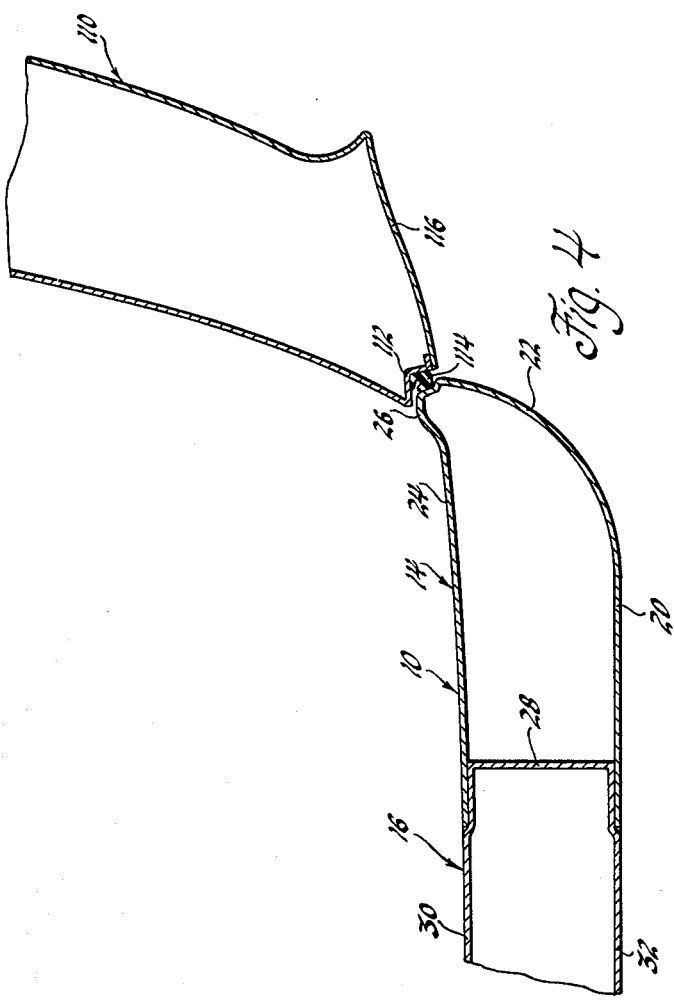

Filed June 17, 1960   3 Sheets-Sheet 3

INVENTOR.
John Himka,
Robert J. Lauer &
BY  Harry A. Mackie

Herbert Furman
ATTORNEY

United States Patent Office 3,034,823
Patented May 15, 1962

3,034,823
VEHICLE BODY
John Himka, Farmington, Robert J. Lauer, Bloomfield Hills, and Harry A. Mackie, Birmingham, Mich., assignors to General Motors Corporation, Detroit, Mich., a corporation of Delaware
Filed June 17, 1960, Ser. No. 36,914
6 Claims. (Cl. 296—28)

This invention relates to vehicle bodies and more particularly to an improved underbody structure for unitary vehicle bodies.

The underbody structure of this invention generally comprises a pair of rigid, self-supporting platform members disposed in side by side relationship intermediate the wheel housings of the body and interconnected by a tunnel cap so as to provide a rigid self-supporting combined underbody and floor for the upper body structure. Each of the platform members is of like construction and includes a plurality of internested inwardly opening channel members, with the outboard channel member providing the rocker panel for the body. The opening of the inboard channel member is closed by a closure channel, the upper leg of which is secured to the upper leg of the inboard channel member and to the side edge of the tunnel cap. The upper legs of each of the channel members are shaped so that each platform member provides an upwardly opening arcuate floor surface for the body, with the longitudinal center or portion of greatest depression of each floor surface being located approximately mid-way between the centerline of the tunnel cap and the outboard edge of the underbody structure and lying generally in a longitudinal vertical plane which includes the vertical centerline of either the driver or the right hand seat passenger.

Each end of each of the platform members is closed by an end cap wich is rigidly secured thereto and provides the connection between the platform members and the legs of front and rear generally U-shaped frame extensions. The tunnel cap merges into and is secured to the toe pan of the body at the forward ends of the platform members, and merges into and is secured to the rear seat riser at the rearward ends of the platform members.

An underbody structure such as provided by this invention has excellent transverse and longitudinal bending moments and also provides an extremely rigid support for the upper body shell. Since the underbody structure is self-supporting, the over-all height of the vehicle can be substantially lowered while still providing ease of entrance and exit since the passenger or driver does not have to step over a large rocker panel structure when entering or leaving the body. By making the upper surface of each of the platform members of arcuate cross section, with the portion of greatest depression lying in a longitudinal plane including the vertical centerline of either the passenger or the driver, increased head room may be obtained.

The primary object of this invention is to provide an improved underbody structure for unitary vehicle bodies. Another object of this invention is to provide an improved underbody structure for unitary vehicle bodies which includes a pair of rigid self-supporting platform members disposed in side by side relationship, with each of the platform members including a plurality of internested channel members. A further object of this invention is to provide an improved underbody structure for unitary vehicle bodies which includes a pair of rigid self-supporting platform members disposed in side by side relationship and interconnected by a tunnel cap, with each of the platform members including a plurality of inwardly opening internested channel members, the upper legs of which are shaped so as to provide an arcuate floor surface.

These and other objects of this invention will be readily apparent from the following specification and drawings, wherein:

FIGURE 1 is a top plan view of an underbody structure according to this invention;

FIGURE 2 is an enlarged view of a portion of FIGURE 1 taken generally along the plane indicated by line 2—2 thereof;

FIGURE 3 is an enlarged sectional view taken generally along the plane indicated by line 3—3 of FIGURE 1;

FIGURE 4 is an enlarged view of a portion of FIGURE 3 showing the relationship between the outboard portion of the underbody structure and one of the vehicle doors.

Figure 5:
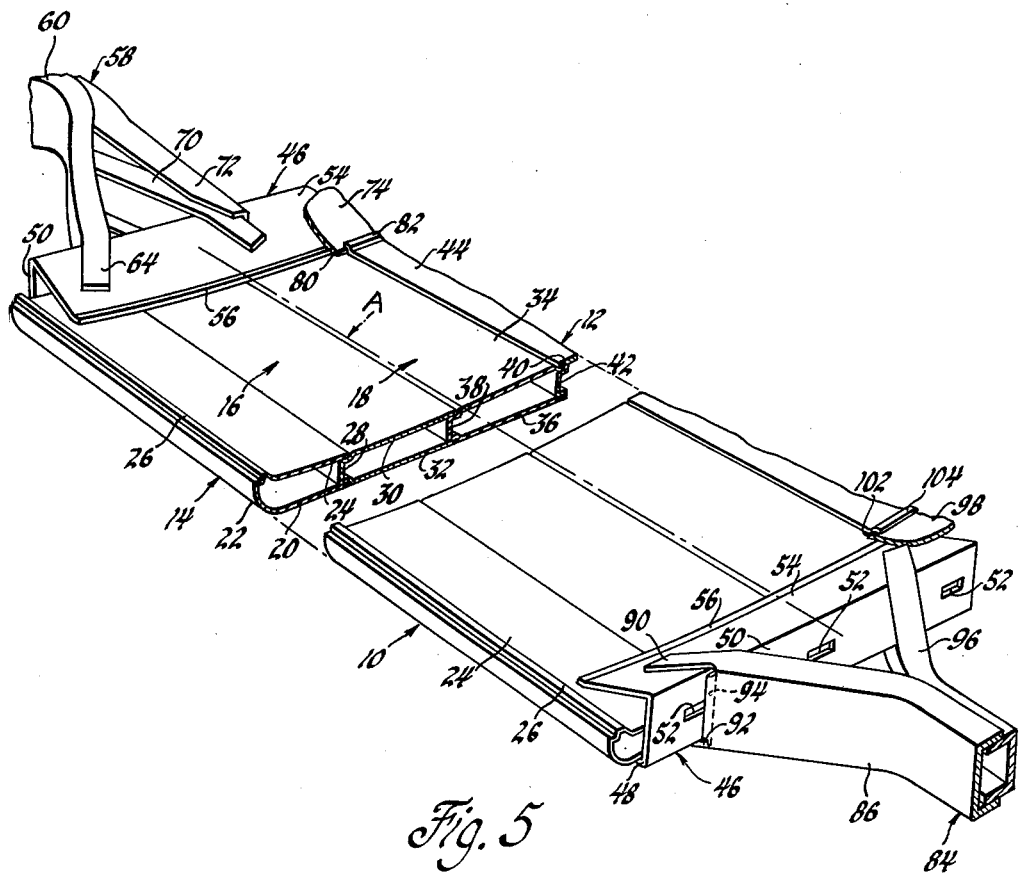
FIGURE 5 is a partially cut away perspective view of a portion of FIGURE 1.

Referring now particularly to FIGURE 1 of the drawings, the underbody structure of this invention generally includes a pair of rigid self-supporting platform members 10 disposed in side by side relationship intermediate the wheel housings of the body and interconnected by a tunnel cap 12 so as to provide a self-supporting combined underbody and floor for the vehicle. Each of the platform members is of like construction, and accordingly like numerals will be used for each.

Referring now particularly to FIGURES 3 and 5 of the drawings, each of the platform members 10 includes three inwardly opening channel members 14, 16, and 18, respectively. Member 14 provides the rocker panel for the body, the lower leg 20 thereof merging arcuately with the arcuate base 22 thereof so as to provide the rocker panel, and with the upper leg 24 thereof including an upwardly extending rib 26 adjacent the base 22 so as to provide a sill structure for the body. A portion of the upper and lower legs 30 and 32, respectively, of member 16 are offset adjacent the base 28 thereof so as to fit within the opening of member 14, with the legs 24 and 20 of member 14 being respectively welded to the offset portions of the legs 30 and 32 of member 16. Likewise, the upper and lower legs 34 and 36, respectively, of member 18 are offset adjacent the base 38 of this member so as to be received within the opening of the member 16, with the legs 30 and 32 of member 16 being respectively welded to the offset portions of the legs 34 and 36 of member 18. The upper leg 34 of member 18 is offset at 40, and a closure channel member 42 fits within the opening of member 18 and has the legs thereof secured to the offset portion 40 of leg 34 and to the leg 36 of member 18 to close the opening of this member. From the foregoing description, it can be seen that the platform member 10 will be of extremely rigid construction since the upper and lower surfaces thereof, as provided by the upper legs 24, 30, and 34 and the lower surface thereof as provided by the lower legs 20, 32, and 36 of the channel members 14, 16, and 18, respectively, are spaced apart by webs provided by the bases 28 and 38 of members 14 and 16, respectively, and by the member 42.

As best shown in FIGURE 3 of the drawings, the upper legs 24, 30, and 34 of the channel members 14, 16, and 18 are shaped so that each of the platform members has an upwardly opening arcuate floor surface. The longitudinal center or portion of greatest depression of the arcuate floor surface is indicated by a dot-dash line marked A in this figure of the drawings and also in FIGURES 1 and 5. The line A indicates a longitudinally disposed vertical plane which is located approximately mid-way between the centerline of the tunnel cap 12 and the outboard edge of each of the platform members, with this plane including the vertical centerline of either the driver or the right hand seat passenger. By so shaping the upper surface of each of the platform members and further by locating the longitudinal plane as set forth above with respect to the tunnel cap and outboard edge of each of the platform members, increased headroom is provided for the driver and the seat passengers.

The platform members 10 are interconnected longitudinally of the body by the flanges 44 of the tunnel cap 12, these flanges fitting within the offset portions 40 and being secured to the portions 40 and to the upper legs of each of the closure members 42.

Each end of each of the platform members is enclosed by a like end cap member 46 of generally channel shaped cross section. The lower leg 48 of each of the caps fits underneath an end of the platform member and is rigidly secured to the lower legs 20, 22, and 36 of members 14, 16, and 18 as shown in FIGURE 3 of the drawings. The base 50 of the cap abuts the end of the platform member and is provided with a number of lanced out, inwardly extending tabs 52 which bear against the edge portions of the upper legs 24, 30, and 34 of the channel members 14, 16, and 18 so as to accurately locate the cap 46 with respect to the end of the platform member. The upper leg 54 of each of the end caps is located angularly with respect to the base 50 thereof and terminates in a flange 56 which is shaped so as to conform to the arcuate upper surface of each of the platform members and is rigidly secured to the upper legs 24, 30, and 34 of the channel members 14, 16, and 18.

A forwardly generally U-shaped frame extension 58 includes a pair of side rails 60 of generally C-shaped cross section which are interconnected by a number of transverse rails 62. The rearward ends of rails 60 flare outwardly of the body and are cut away to provide upper and lower flanges 64 and 66 which straddle and are rigidly secured to the upper and lower legs 54 and 48, respectively, of the forward end caps 46 of each of the platform members. A lateral flange 68 intermediate flanges 64 and 66 engages and is secured to the bases 50 of the front end caps. Braces 70 of C-shaped cross section have their forward ends fitting within and secured to rails 60 with their rearward ends cut away to provide upper and lower flanges similar to the flanges 64 and 66 so as to straddle and be secured to the forward end caps 46. A pair of motor support braces 72 extend rearwardly from an intermediate portion of the rails 60, with these braces being generally of C-shaped cross section and partially cut away so as to straddle and be secured to the rearward ends of the braces 70.

The toe pan 74 includes a central tunnel portion 76 which merges with the central tunnel portion 78 of tunnel cap 12, with the rearward edge portion 80 of the toe pan being shaped so as to conform to the upper surface of each of the platform members and being secured thereto immediately rearwardly of the flanges 56 of the forward end caps 46. The flanged forward end 82 of the tunnel cap 12 overlaps and is secured to the central rearward end portion of the toe pan 74.

The rear generally U-shaped frame extension 84 includes a pair of side rails 86 of C-shaped cross section interconnected by a plurality of transverse rails 88. The forward ends of rails 86 flare outwardly of the body and are cut away so as to provide upper and lower flanges 90 and 92, respectively, which straddle and are secured to the upper and lower legs 54 and 48 of the rear end caps 46. A lateral flange 94 intermediate flanges 90 and 92 bears against and is secured to the base 50 of each of the rear end caps. Braces 96 of generally C-shaped cross section have their rearward ends secured to the rails 86 and their forward ends cut away in a like manner as the forward ends of the rails 86 so as to be secured to the rear end caps 46 inboard of the attachment of the forward ends of the rails 86.

The seat riser panel 98 includes a tunnel portion 100 which merges with the tunnel portion 78 of the tunnel cap 12. The forward edge portion 102 of the seat riser panel is shaped so as to conform to the upper surfaces of the platform members and is rigidly secured thereto immediately forward of the flanges 56 of the rear end caps 46. The flanged rear edge portion 104 of the tunnel cap 12 overlaps and is secured to the edge portion 102 of the seat riser panel.

Referring now particularly to FIGURE 4 of the drawings, the relationship between a typical vehicle door and the underbody structure of this invention will be described. The vehicle door 110 includes an inboard rabbetted edge 112 which mounts a compression type weatherstrip 114. The weatherstrip 114 seals against the outboard leg of the rib 26 when the door 110 is in closed position so as to seal the body against the entry of foreign material. It will further be noted that the lower wall 116 of the door is located on the same general lever as the upper surface of each of the platform members so as to provide a neat and pleasing appearance to the body and further so as to allow the door to be opened and closed if the vehicle is standing next to an obstruction such as a curb or the like.

Thus, this invention provides a new and improved combined underbody and floor for integral vehicle bodies.

We claim:
1. In a motor vehicle, an underbody structure comprising, in combination, a pair of rigid platform members disposed in spaced side by side juxtaposed relationship intermediate the wheel housings of said vehicle, each of said platform members including a plurality of internested longitudinally extending channel members, the upper legs of said channel members providing the floor surfaces of said platform members and the lower legs of said channel members defining the lower walls of said platform members, and a tunnel cap disposed between and secured to the juxtaposed inboard side edge portions of each of said platform members to provide a self-supporting combined underbody and floor for said vehicle.

2. In a motor vehicle, an underbody structure comprising, in combination, a pair of rectangularly-shaped rigid platform members disposed in spaced side by side juxtaposed relationship intermediate the wheel housings of said vehicle, each of said platform members including a plurality of internested longitudinally extending channel members opening inwardly of said vehicle, the upper legs of said channel members providing the floor surfaces of said platform members and the lower legs of said channel members providing the lower walls of said platform members, a tunnel cap disposed between and secured to the juxtaposed side edge portions of each of said platform members to provide a self-supporting combined underbody and floor for said vehicle, and front and rear frame extensions disposed at opposite ends of said platform members, each of said extensions including a pair of side rail structures secured to a respective end of each of said platform members.

3. In a motor vehicle, an underbody structure comprising, in combination, a pair of rigid platform members disposed in spaced side by side juxtaposed relationship intermediate the wheel housings of said vehicle, a tunnel cap disposed between and secured to the juxtaposed inboard side edge portions of each of said platform members to provide a self-supporting combined underbody and floor for said vehicle, each of said platform members including a plurality of internested inwardly opening longitudinally extending channel members, the upper legs of said channel members providing the floor surfaces of each of said platform members and the lower legs thereof providing the lower walls of said platform members, said floor surfaces being of generally semi-cylindrical transverse cross section and having their longitudinal portion of greatest depression located generally midway between the center of said underbody structure and the outboard edges thereof, and front and rear frame extensions disposed at opposite ends of said platform members, each of said extensions including a pair of side rail structures secured to a respective end of each of said platform members.

4. In a motor vehicle, an underbody structure comprising, in combination, a pair of rigid platform members disposed in spaced side by side juxtaposed relationship intermediate the wheel housings of said vehicle, and a tunnel cap disposed between and secured to the juxtaposed inboard side edge portions of each of said platform members to provide a self-supporting combined underbody and floor for said vehicle, each of said platform members including a plurality of internested inwardly opening longitudinally extending channel members, the upper legs of said channel members providing the floor surfaces of said platform members and the lower legs thereof defining the lower walls of said platform members, the outboard channel member providing the rocker panel of said vehicle, each successive inboard channel member having the upper and lower legs thereof offset laterally adjacent the base thereof so as to be received within the opening of the preceding channel member and locate said legs flush with respect to each other, the bases of each of said channel members thereby providing longitudinally extending webs interconnecting the floor surfaces and the lower walls of said platform members.

5. In a motor vehicle, an underbody structure comprising, in combination, a pair of rigid platform members disposed in spaced side by side juxtaposed relationship intermediate the wheel housings of said vehicle, and a tunnel cap disposed between and secured to the juxtaposed inboard side edge portions of each of said platform members to provide a self-supporting combined underbody and floor for said vehicle, each of said platform members including a plurality of internested inwardly opening longitudinally extending channel members, the upper legs of which provide the floor surfaces of said platform members and the lower legs of which provide the lower walls of said platform members; the outboard channel member providing the rocker panel for said vehicle, each successive channel member inboard of said outboard channel member having the upper and lower legs thereof offset laterally adjacent the base thereof so as to be received within the opening of the preceding channel member and locate said legs flush with respect to each other, the bases of said channel members thus providing longitudinally extending webs interconnecting said floor surfaces and said lower walls of said platform members, said floor surfaces being of generally semi-cylindrical transverse cross section and having their longitudinal portion of greatest depression located generally midway between the center of said underbody structure and the outboard edges thereof.

6. In a motor vehicle, an underbody structure comprising, in combination, a pair of rigid platform members disposed in spaced side by side juxtaposed relationship intermediate the wheel housings of said vehicle and each including an integral rocker panel located at the outboard edge thereof, a tunnel cap disposed between and secured to the juxtaposed inboard side edge portions of each of said platform members to provide a self-supporting combined underbody and floor for said vehicle, each of said platform members including a plurality of internested inwardly opening longitudinally extending channel members, the upper and lower legs and base of the outboard channel members being shaped to provide said integral rocker panels for said vehicle, each successive channel member inboard of said outboard channel member having the upper and lower legs thereof offset laterally adjacent the base thereof so as to be received within the opening of the preceding channel member and locate said legs flush with respect to each other, said upper legs of said channel members providing the floor surfaces of each of said platform members and said lower legs of said channel members providing the lower walls of said underbody structure, said bases of said channel members providing longitudinally extending web members interconnecting said floor surfaces and said lower walls, said floor surfaces being of generally semi-cylindrical transverse cross section and having their longitudinal portion of greatest depression located generally midway between the center of said underbody structure and the outboard edges thereof, and front and rear frame extensions disposed at opposite ends of said platform members, each of said extensions including a pair of side rail structures secured to a respective end of each of said platform members.

References Cited in the file of this patent

UNITED STATES PATENTS

| | | |
|---|---|---|
| 2,544,525 | Cadwallader | Mar. 6, 1951 |
| 2,646,991 | Weaving | July 28, 1953 |
| 2,926,928 | Bennett | Mar. 1, 1960 |
| 2,935,335 | Muller | May 3, 1960 |

FOREIGN PATENTS

| | | |
|---|---|---|
| 884,399 | France | Apr. 27, 1943 |
| 934,628 | Germany | Nov. 3, 1955 |
| 771,298 | Great Britain | Mar. 27, 1957 |